Patented Oct. 11, 1932

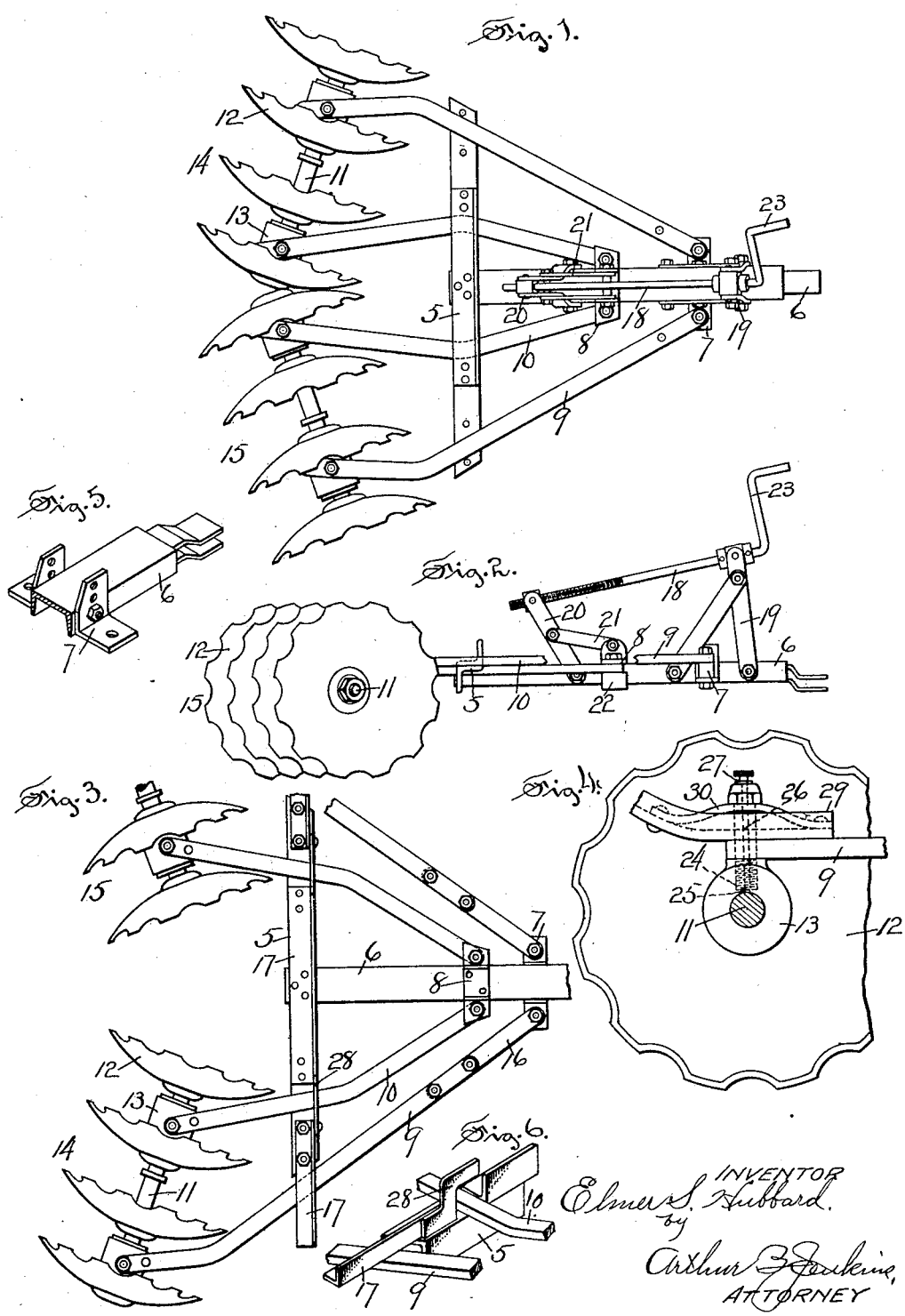

1,881,599

UNITED STATES PATENT OFFICE

ELMER S. HUBBARD, OF HIGGANUM, CONNECTICUT

HARROW

Application filed April 8, 1932. Serial No. 603,994.

My invention relates to that class of agricultural implements which are employed for softening or breaking the soil to condition it for agricultural purposes, and an object of my invention, among others, is the production of an implement of this type that shall be extremely strong and which shall be particularly efficient in operation.

One form of a harrow embodying my invention, and in the construction and use of which the objects herein set out, as well as others, may be attained is illustrated in the accompanying drawing, in which—

Figure 1 is a top view of my improved harrow showing the disk gangs in position to throw the soil outwardly.

Figure 2 is a view in side elevation of the same.

Figure 3 is a view similar to Figure 1, but showing the disk gangs in position to draw the soil inwardly, parts of the device being broken off.

Figure 4 is a detail view on an enlarged scale illustrating the mounting of the harrow disks, the inner end of one of the weight box supporting arms being shown in this figure, and this showing being omitted from the other figures.

Figure 5 is a detail isometric view illustrating the attachment for the forward anchor bars.

Figure 6 is a detail isometric view illustrating the engagement of the angling bars with the supporting cross bar.

In the use of harrows of this type it is quite desirable that the soil shall be thrown outwardly in some cases and shall be drawn inwardly in other cases, and in order to obviate the necessity for having two harrows to perform these two functions I have equipped my improved harrow, illustrated and described herein, with means whereby the disk gangs may be changed to perform the two functions. In the illustrations in the drawing herein the numeral 5 denotes a supporting cross bar constructed in any suitable manner, commonly of angle iron, and having a draft bar 6 secured thereto and projecting forwardly and equipped with any suitable means for attachment to a draft animal or machine. Anchor bars 7 and 8 are secured to the draft bar, projecting on opposite sides thereof, outer angling bars 9 being secured to opposite ends of the bar 7 located forwardly of the bar 8 on the bar 6. Inner angling bars 10 are pivotally secured to the opposite ends of the bar 8.

Disk gangs 14 and 15 are pivotally attached to each pair of angling bars, each of said pairs comprising an outer bar 9 and an inner bar 10 and each gang comprises a shaft 11 to which disks 12 are secured, said shafts being journaled in boxes or bearings 13 to which the bars 9 and 10 are pivotally attached at their rear ends.

The disk gangs 14 and 15 are arranged as shown in Figure 1 when it is desired to throw the soil outwardly, the adjacent ends of the gangs being placed in contact, or substantially so. When the gangs are thus disposed there is a tendency of the outer ends of the gangs to dig into the soil and to thereby lower the outer and raise the inner ends of the gangs. Therefore in order to obviate this tendency the outer bars 9 are placed on top of the cross bar 5 and the inner bars 10 are placed underneath said cross bar. When it is desired to throw the soil inwardly the gangs 14 and 15 are separated, as shown in Figure 3. In this disposition of the gangs the axes thereof extend in directions transverse to the arrangement shown in Figure 1 wherein the gangs are arranged to throw the dirt or soil outwardly, mechanism to be hereinafter described being employed for changing this angularity from either of the positions shown.

In order to provide for this change in angularity of the two gangs, and also to permit them to be spaced as desired, the angling bars 9 must be lengthened, as the gangs are swung on the pivots at the ends of the bars 10, and as the gangs in this position are spaced wider apart it also becomes necessary to lengthen the supporting bar 5. I therefore provide angling bar extensions 16 at the forward ends of each of the bars 9, and I also provide cross bar extensions 17 at opposite ends of the cross bar, and as shown in Figure 3 of the drawing. As these extensions would be an impediment to the use of the harrow arranged as shown in Figure 1, these extensions are semi-permanently secured in place, that is, they are bolted in place so that they may be removed with little difficulty.

It will be noted that the angling bars are carried toward the end of the cross bars in the arrangement just described, and as the tendency is now for the inner ends of the gangs to dig in to the soil and the outer end to consequently rise, the bars 10 are placed on top of the cross bar 5 and the bars 9 are placed underneath the extensions 17, thereby counteracting the tendency just referred to.

When the arrangement shown in Figure 3 is to be made use of the positions of the gangs are reversed, but the disks on the gangs are maintained facing in the same direction. The gang 14, in this arrangement, is placed in the position of the gang 15, and vice versa, and it is therefore seen that the same gangs may be used, together with the same frame, the latter being enabled by the use of the extensions 16 and 17.

After the gangs are assembled as desired the angling is performed by means of an angling shaft 18 mounted at one end in a support 19 and engaged at its opposite, screw threaded end in a nut pivotally secured between the outer ends of adjusting bars 20, the opposite ends of said adjusting bars being pivotally attached to the draft bar 6. A pair of connecting bars 21 are each pivotally attached at one end to each of the bars 20, the opposite ends of the bars 21 being pivotally attached to a slide 22 of which the anchor bar 8 forms a part, said slide being mounted for reciprocating sliding movement on the draft bar 6. The shaft 18 is provided with a crank handle 23 by means of which the gangs may be relatively disposed at any desired angle, this angling mechanism of itself being old in harrows of this type and for which reason a further and detailed description is omitted herein, as it will be readily understood by those skilled in the art.

I have found it of material advantage, in a harrow of this type, to secure the angling bars 9 and 10 to the tops of the boxes 13 so that the draft on the disk gangs will come at the tops of said boxes. In accomplishing this purpose I provide studs 24 of heavy structure which are screw threaded into holes in the tops of the boxes, with ports 25 extending from the bottoms of said holes into the openings for the shafts 11, and as shown in dotted lines in Figure 4 of the drawing. A passage 26 is formed through each of the studs for the supply of lubricant to the shafts 12 and an oil cup 27 may be provided to close the passage against the entrance of dirt thereto. This provides a convenient and very efficient means for lubricating the shafts.

The bolts or similar fastenings for the forward ends of the angling bars 9 and 10 are loose enough to permit more or less freedom of action of the disk gangs to pass over objects as stones or roots, thus permitting endwise tipping movement of the gangs to a limited extent. In order, however, to prevent excessive tipping movement of said gangs at such times I provide stops 28 which are secured to the extensions 17 of the cross bar, the upper ends of these stops being extended so that the bars 10 underlie such extended parts.

Weight boxes to contain stones or other material for weighting the gangs are employed in a manner common to harrows of this type, the showing of such weight boxes being omitted herein except for the ends of the arms which are secured to the bearing boxes 13, and as shown in Figure 4. These arms are commonly formed of angle iron and the inner ends 29 thereof are secured to the studs 24 and they are reinforced by straps 30 which serve to stiffen the arms, the studs 24 passing upwardly through the arms and the reinforcing straps which are bowed thus providing a long bearing for the studs.

The anchor bars 7 preferably consist of two members secured to opposite sides of the draft bar 6, and as shown in Figure 5 of the drawing, the angling bars 9 being secured to the outturned or horizontal portion of said anchor bars. In use the force upon the disks 12 sometimes causes the angling bars to be bent downwardly, and this may be compensated for by providing a series of holes in the vertical portions of the anchor bars, and as shown in Figure 5, by means of which said anchor bars may be raised or lowered to meet the emergencies.

In accordance with the provisions of the patent statutes I have described the principles of operation of my invention together with the device which I now consider to represent the best embodiment thereof; but I desire to have it understood that the device shown is only illustrative, and that the invention may be carried out by other means and applied to uses other than those above set out.

I claim:

1. A supporting frame for a harrow, said frame comprising a cross bar and a draft bar secured thereto and extending therefrom, pairs of angling bars attached to said draft bar on opposite sides thereof, a disk gang supported by each of said pairs of angling bars, and means whereby each of said gangs may be placed in the same position on either pair of angling bars.

2. A supporting frame for a harrow, said frame comprising a cross bar and a draft bar secured thereto and extending therefrom, pairs of angling bars attached to said draft bar on opposite sides thereof, a disk gang supported by each of said pairs of angling bars, each of said gangs comprising a journal, and means for attaching one of said journals to an end of each of said angling bars.

3. A supporting frame for a harrow, said frame comprising a cross bar and a draft bar secured thereto and extending therefrom, pairs of angling bars attached to said draft bar on opposite sides thereof, a disk gang supported by each of said pairs of angling bars, means whereby said gangs may be placed in the same positions on either pair of angling bars, and means for temporarily lengthening the cross bar to permit separation of said disk gangs when placed in one of said positions.

4. A supporting frame for a harrow, said frame comprising a cross bar and a draft bar secured thereto and extending therefrom, pairs of angling bars attached to said draft bar on opposite sides thereof, a disk gang supported by each of said pairs of angling bars, means whereby said gangs may be placed in the same positions on either pair of angling bars, and means for temporarily lengthening one of each pair of angling bars to permit separation of said disk gangs when placed in one of said positions.

5. A supporting frame for a harrow, said frame comprising a cross bar and a draft bar secured thereto and extending therefrom, pairs of angling bars attached to said draft bar on opposite sides thereof, a disk gang supported by each of said pairs of angling bars, means whereby said gangs may be placed in the same positions on either pair of angling bars, and means for lengthening the outside member of each pair of angling bars to permit separation of said disk gangs when placed in one of said positions.

6. A supporting frame for a harrow, said frame comprising a cross bar and a draft bar secured thereto and extending therefrom, pairs of angling bars attached to said draft bar at opposite sides thereof, a disk gang supported by each of said pairs of angling bars, means whereby said gangs may be placed in the same positions on either pair of angling bars, means applied at opposite ends of the cross bar for temporarily lengthening it to permit separation of said disk gangs when placed in one of said positions, and means for temporarily extending the forward ends of the outer members of said angling bars.

7. A supporting frame for a harrow, said frame comprising a cross bar and a draft bar secured thereto and extending therefrom, pairs of angling bars attached to said draft bar on opposite sides thereof, a disk gang supported by each of said pairs of angling bars, each of said gangs comprising a journal through which a gang shaft extends, and means for attaching each of said angling bars to the top of one of said journals.

8. A supporting frame for a harrow, said frame comprising a cross bar and a draft bar secured thereto and extending therefrom, pairs of angling bars attached to said draft bar on opposite sides thereof, a disk gang supported by each of said pairs of angling bars, each of said gangs comprising a journal through which a gang shaft extends, a stud entered in each of the journals and extending outwardly therefrom through the end of one of said angling bars, said stud having an oil passage therethrough, and means at the end of said stud for receiving a lubricant.

9. A supporting frame for a harrow, said frame comprising a cross bar and a draft bar secured thereto and extending therefrom, pairs of angling bars attached to said draft bar on opposite sides thereof, a disk gang supported by each of said pairs of angling bars, each gang comprising journals with a gang shaft extending therethrough, a stud entered into each journal and extending outwardly therefrom and having a lubricant passage therein, said stud passing through one of said angling bars, a weight box supporting arm engaged with said stud, means for securing said arm and bar to the stud, and lubricant receiving means attached to the outer end of said stud.

10. A supporting frame for a harrow, said frame comprising a cross bar and a draft bar secured thereto and extending therefrom, pairs of angling bars attached to said draft bar on opposite sides thereof, a disk gang supported by each of said pairs of angling bars, each gang comprising journals with a gang shaft extending therethrough, a stud entered into each journal and extending outwardly therefrom and having a lubricant passage therein, said stud passing through one of said angling bars, a weight box supporting arm engaged with said stud, a bowed strap secured at its opposite ends to one of said weight supporting bars, said stud passing through said strap, means for securing said strap, weight supporting bar and angling bars to said stud, and lubricant receiving means attached to the end of said stud.

11. A supporting frame for a harrow, said frame comprising a cross bar and a draft bar secured thereto and extending therefrom, pairs of angling bars attached to said draft bar on opposit sides thereof, a disk gang supported by each of said pairs of angling bars extended across said cross bar, means for placing each of said disk gangs in the same position or either pair of angling bars, extensions removably attached to the ends of said cross bar to lengthen the latter, and a stop projecting from each extension to overlie one of the angling bars of each pair to limit its movement away from said cross bar.

ELMER S. HUBBARD.